United States Patent
Clemen

(10) Patent No.: US 8,523,517 B2
(45) Date of Patent: Sep. 3, 2013

(54) CROSS-SECTIONAL PROFILE FOR THE STRUTS OR THE FAIRING OF STRUTS AND SERVICE LINES OF A TURBOFAN ENGINE

(75) Inventor: Carsten Clemen, Mittenwalde (DE)

(73) Assignee: Rolls-Royce Deutschland Ltd & Co. (DE)

( * ) Notice: Subject to any disclaimer, the term of this patent is extended or adjusted under 35 U.S.C. 154(b) by 557 days.

(21) Appl. No.: 12/836,385

(22) Filed: Jul. 14, 2010

(65) Prior Publication Data

US 2011/0016883 A1 Jan. 27, 2011

(30) Foreign Application Priority Data

Jul. 23, 2009 (DE) .......................... 10 2009 034 530

(51) Int. Cl.
*F01D 1/02* (2006.01)
(52) U.S. Cl.
USPC .................. 415/183; 416/244 R; 416/DIG. 2
(58) Field of Classification Search
USPC .............. 415/185, 183, 191, 196, 220, 914, 415/142; 416/244 R, 500, DIG. 2, DIG. 5
See application file for complete search history.

(56) References Cited

U.S. PATENT DOCUMENTS

| | | | | |
|---|---|---|---|---|
| 3,403,889 A | * | 10/1968 | Ciokajlo | 415/220 |
| 7,673,461 B2 | * | 3/2010 | Cameriano et al. | 60/797 |
| 7,946,806 B2 | * | 5/2011 | Murphy | 415/145 |
| 2009/0028698 A1 | * | 1/2009 | McCaffrey | 415/208.1 |
| 2009/0035130 A1 | * | 2/2009 | Sonoda et al. | 415/191 |

* cited by examiner

*Primary Examiner* — Edward Look
*Assistant Examiner* — William Grigos
(74) *Attorney, Agent, or Firm* — Timothy J. Klima; Shuttleworth & Ingersoll, PLC

(57) ABSTRACT

The aerodynamically shaped, symmetrical cross-sectional profile for the struts or the fairing (7) of struts and service lines in the bypass duct and the core-flow duct of a turbofan engine is defined by a course of the local thickness (T) and a position of maximum thickness (PMT) on both sides over the central chord (C) extending from the leading edge (LE) to the trailing edge (TE) of the strut or fairing (7). In order to avoid flow separations the course of the local thickness (T) between the position of maximum thickness (PMT) and a trailing-edge position (PTE), which is at 95 percent of the chord length, has a first turning point (WP1) with a trailing-edge thickness (TET) and a subsequent second turning point (WP2).

Figure 1:
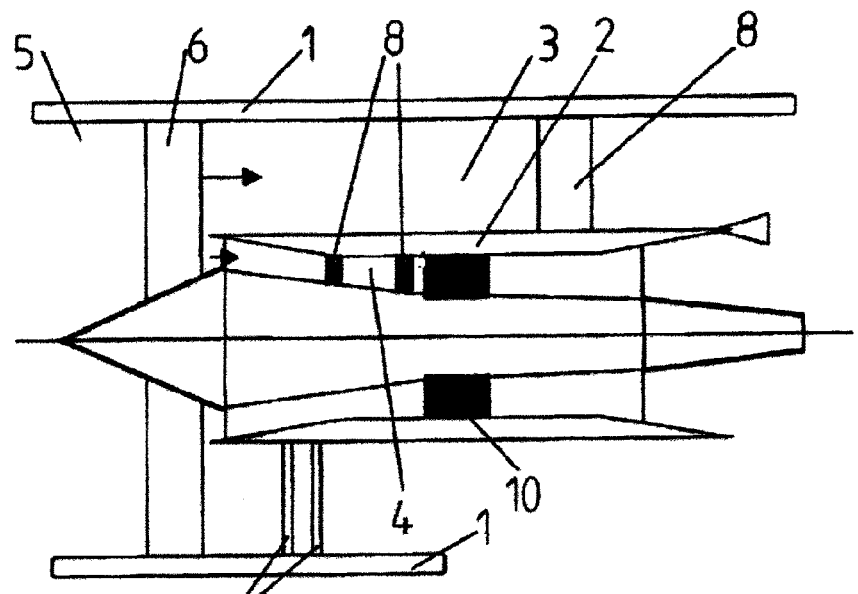

5 Claims, 2 Drawing Sheets

CROSS-SECTIONAL PROFILE FOR THE STRUTS OR THE FAIRING OF STRUTS AND SERVICE LINES OF A TURBOFAN ENGINE This invention relates to an aerodynamically shaped, symmetrical cross-sectional profile for the struts or the fairing of struts and service lines in the bypass duct and the core-flow duct of a turbofan engine.

Turbofan engines are provided at the air intake with a fan (or "blower") downstream of which the airflow produced by the latter is divided into a core airflow and a bypass airflow. The core airflow flows in a core-flow duct surrounded by a bypass duct passed by the bypass airflow. Radially extending supporting elements bear the outer wall of the bypass duct, which is formed by the engine fairing, against the sidewall of the core-flow duct, which is also the inner wall of the bypass duct. Furthermore, radially extending service lines for the aircraft and the engine are arranged in the bypass duct which are enclosed, individually or as a group, by aerodynamically shaped fairing elements. The supporting elements are also surrounded by aerodynamically shaped fairing elements or have an aerodynamically shaped cross-sectional profile. Also in the core-flow duct of the engine, supporting elements are arranged which are aerodynamically faired or themselves have an aerodynamic profile. The aerodynamic shape of the fairing or the struts themselves is intended to reduce pressure losses in the bypass duct and the core-flow duct and abate vibrations and mechanically and acoustically adverse effects associated therewith. The aerodynamic design of the supporting and fairing elements nearly or completely conforms to that of the so-called NACA profiles, which are well-known to be used and which are defined as the course of the local thickness along the chord of the cross-sectional profile. While the pressure losses are less with the arrangement of fairing elements than without it, the relatively large volume of the fairing elements or the aerodynamically shaped struts can, despite their aerodynamic design, lead to considerable pressure losses and wakes conflicting with the objective of achieving optimum engine performance and low fuel consumption as well as minimum vibrations and sound emissions.

In a broad aspect, the present invention provides an aerodynamically shaped cross-sectional profile for the struts or the fairing of struts and service lines in the bypass duct and for the struts in the core-flow duct of a turbofan engine by which a reduction of the pressure losses, sound emissions and vibrations is effected.

It is a particular object of the present invention to provide solutions to the above problems by a cross-sectional profile designed in accordance with the features described herein. Useful developments of the present invention will become apparent from the present description.

On the basis of an aerodynamic cross-sectional profile defined by a respective course of the local thickness and a respective position of the maximum thickness on both sides over the central chord extending from the leading edge to the trailing edge of the strut or fairing, the present invention, in its essence, provides that the course of the local thickness between the position of the maximum thickness and a certain trailing-edge position situated at 95 percent of the chord length has a first turning point (WP1) and a subsequent second turning point (WP2). The turning points disposed in the course of the local thickness in this specified area avoid or minimize flow separations to such an extent that pressure losses and the resultant higher fuel consumption as well as the sound emissions and vibrations can be reduced.

In a further embodiment of the present invention, the course of the local thickness in the area of the turning points is provided such that, originating from the position of maximum thickness, the initially negative gradient of the course of the local thickness is less or zero or positive in the first turning point, and, in accordance with the previous gradient, is either increasingly negative or negative or decreasingly positive in the second turning point.

In a further development of the present invention, the trailing-edge thickness in the trailing-edge position has a value between 10 percent and 65 percent of the maximum thickness.

In the first turning point, the local thickness is always smaller than the maximum thickness and, in the second turning point, is always greater than the trailing-edge thickness in the trailing-edge position.

The course of the local thickness to the maximum thickness, the position of the maximum thickness, the maximum thickness itself and the disposition of the turning points between the position of maximum thickness and the trailing-edge position are optional.

Figure 2:
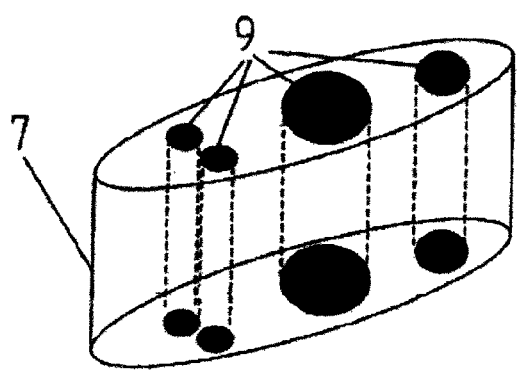
Figure 4:
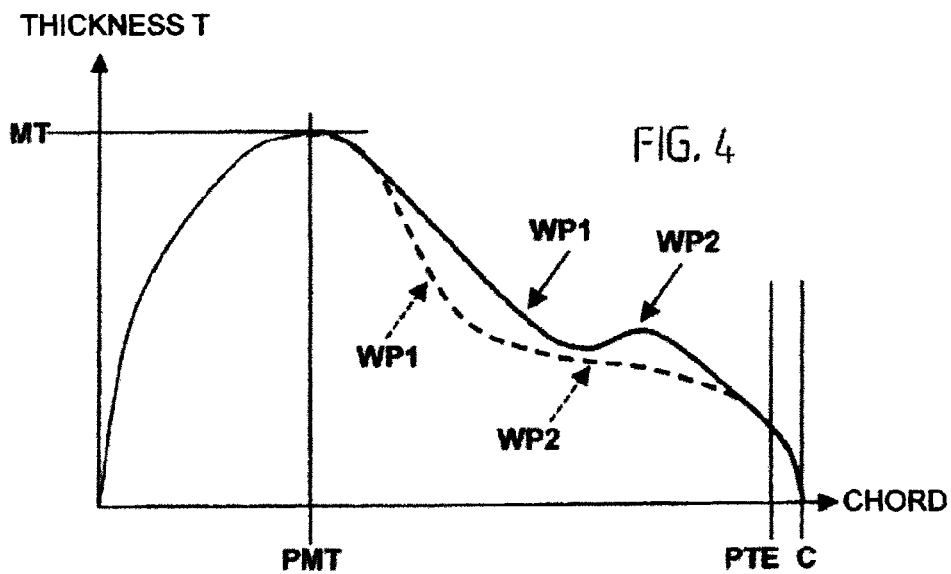
Figure 3:
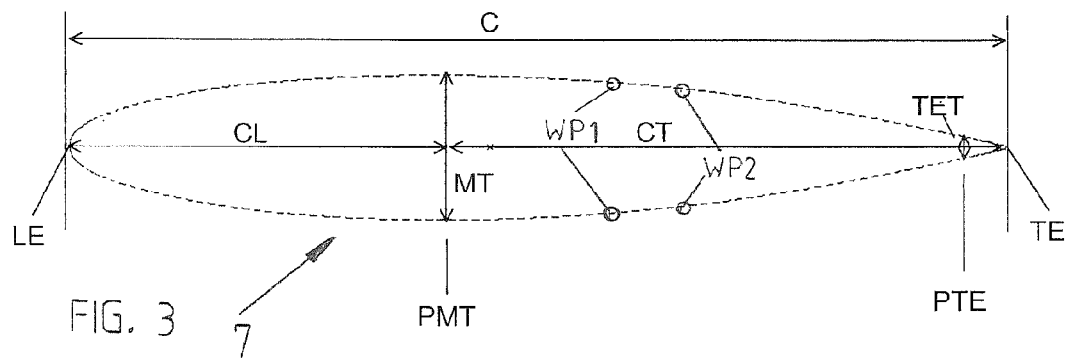

The present invention is more fully described in light of the accompanying drawing showing a preferred embodiment. In the drawing, FIG. 1 is a highly simplified schematic sectional view of a turbofan engine in two different variants of the bypass duct, FIG. 2 is a schematic representation of supply tubes and service lines arranged as a bundle in the bypass duct and enclosed by a conventional fairing, FIG. 3 is a representation showing the definition of the cross-sectional profile for a strut or a fairing, FIG. 4 shows the course of thickness for a cross-sectional profile defined as per FIG. 3, and FIGS. 5 to 7 show different embodiments of cross-sectional profiles of struts or fairings.

The turbofan engine shown in FIG. 1 includes a bypass duct 3, which is confined by the engine fairing 1 and an inner sidewall 2, and a core-flow duct 4 with a fan 6 arranged upstream in an intake 5. Arranged in the bypass duct 3 are struts 8 and service lines 9 enclosed by a faring 7 (FIG. 2). Further struts 8, provided with a fairing (not shown), are arranged upstream of the combustion chamber 10 in the core-flow duct 4.

The cross-sectional profile of the fairing 7 is defined by a chord C extending between the leading edge LE and the trailing edge TE and the course of the local thickness T over the chord length, as well as a maximum thickness MT with a position PMT (position of maximum thickness) and a trailing-edge thickness TET in a trailing-edge position PTE (position of the trailing-edge thickness). The distance, i.e. the partial chord length, between the position of maximum thickness PMT and the leading edge LE or the trailing edge TE, respectively, is marked CL or CT, respectively.

The course of the local thickness T along the chord C from the leading edge LE to the maximum thickness MT in the position PMT is conventionally designed. This also applies to the course of the local thickness T between the trailing-edge position PTE and the trailing edge IE. The trailing-edge position PTE is defined at 95 percent of the length of the chord C of the cross-sectional profile, and the local thickness T in this position, i.e. the trailing-edge thickness TET, ranges from 10 percent to 65 percent of the maximum thickness (0.10<TET/MT<0.65). In the course of the local thickness T between the—optionally situated—position of maximum thickness PMT and the defined trailing-edge position PTE, two turning points, WP1 and WP2, are disposed at an optional position—as exemplified in FIG. 4 by the solid line or the broken line. Between the position of maximum thickness PMT and the first turning point WP1, the course of the local thickness T has an increasingly negative gradient which, up to the second turning point WP2, becomes less again (broken line in FIG. 4) and can also be zero or even positive (solid line in FIG. 4), but with the local thickness T remaining smaller than the maximum thickness MT. From the second turning point WP2 to the trailing-edge position PTE, the gradient decreases again, i.e. the gradient will be smaller if it previously was positive, the gradient will be negative if it previously was zero, and the gradient will be increasingly negative if it previously was already negative.

Figure 5:
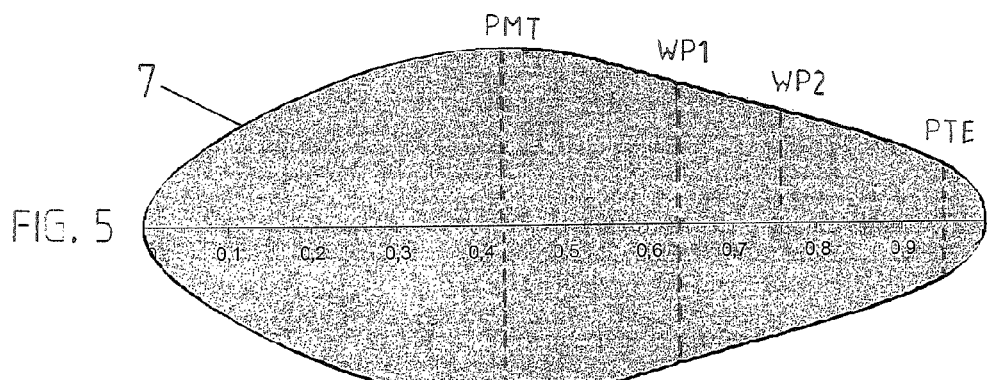
Figure 6:
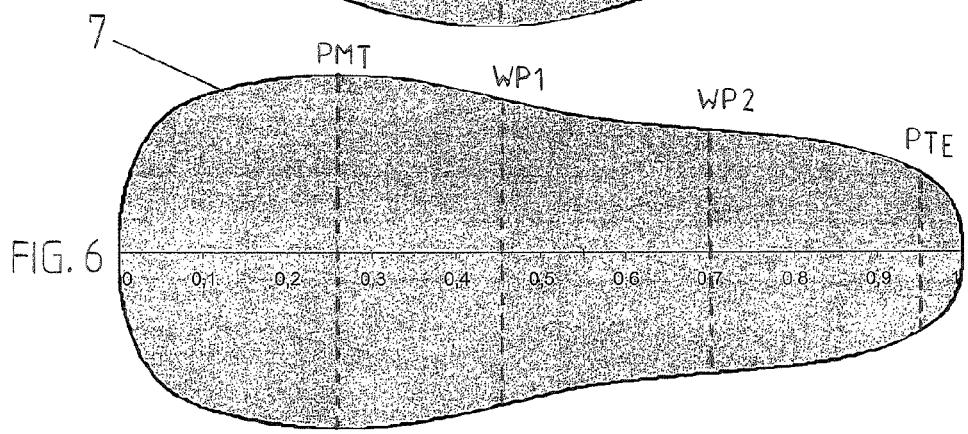
Figure 7:
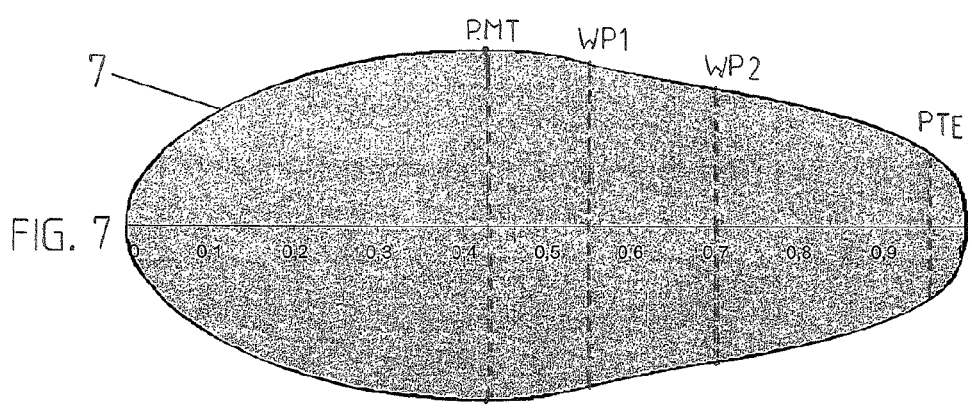

While the course of the local thickness T has been exaggerated in FIG. 4 for clarity, FIGS. 5 to 7 show examples of cross-sectional profiles of fairings 7 in which the position of maximum thickness PMT is different and the trailing-edge position PTE each lies at 95 percent of the length of chord C and the trailing-edge thickness TET at this position has a value between 10 and 65 percent of the maximum thickness PMT (0.10<TET/MT<0.65).

LIST OF REFERENCE NUMERALS

1 Engine fairing
2 Inner sidewall
3 Bypass duct
4 Core-flow duct
5 Intake
6 Fan
7 Fairing
8 Struts
9 Service lines
10 Combustion chamber
C Chord
T Local thickness over C
MT Maximum thickness
TET Trailing-edge thickness
PMT Position of maximum thickness
PTE Trailing-edge position
LE Leading edge of 7
TE Trailing edge of 7
CL Chord length between LE and PMT
CT Chord length between PMT and TE
WP1 First turning point
WP2 Second turning point

What is claimed is:

1. An aerodynamically shaped, symmetrical cross-sectional profile for at least one chosen from a strut, a fairing of a strut and a service line positioned in at least one chosen from a bypass duct and a core-flow duct of a turbofan engine,
wherein the profile is defined by a course of a local thickness (T) and a position (PMT) of maximum thickness (MT) on both sides over a central chord (C) extending from a leading edge (LE) to a trailing edge (TE) of the at least one chosen from the strut, the fairing of a strut and the service line,
wherein, in order to avoid flow separations, the course of the local thickness (T) between the position of maximum thickness (PMT) and a certain trailing-edge position (PTE) has a first turning point (WP1), and a subsequent second turning point (WP2), with the trailing-edge position (PTE) being positioned at approximately 95% of a length of the chord (C) and having a trailing-edge thickness (TET);
the profile including:
a first zone from the leading edge (LE) to the position of maximum thickness (PMT);
a second zone from the position of maximum thickness (PMT) to the first turning point (WP1) where the course of the local thickness (T) has a second gradient;
a third zone from the first turning point (WP1) to the second turning point (WP2) where the course of the local thickness (T) has a third gradient differing from the second gradient; and
a fourth zone from the second turning point (WP2) to the trailing-edge position (PTE) where the course of the local thickness (T) has an increasingly negative gradient as compared to the third gradient.

2. The cross-sectional profile in accordance with claim 1, wherein:
the second gradient is increasingly negative in the second zone;
the third gradient in the third zone is less negative than the second gradient and can range between a negative gradient and a positive gradient.

3. The cross-sectional profile in accordance with claim 2, wherein the trailing-edge thickness (TET) over the chord (C) in the trailing-edge position (PTE) has a value between 10 percent and 65 percent of the maximum thickness (MT) over the chord (C).

4. The cross-sectional profile in accordance with claim 2, wherein the local thickness (T) in the first turning point (WP1) is always smaller than the maximum thickness (MT) and, in the second turning point (WP2), is always greater than the trailing-edge thickness (TET).

5. The cross-sectional profile in accordance with claim 1, wherein the profile in the first zone is conventionally optional in design.

* * * * *